(12) United States Patent
Xie et al.

(10) Patent No.: US 12,414,138 B2
(45) Date of Patent: Sep. 9, 2025

(54) MODE SWITCHING METHOD, TERMINAL, AND NETWORK-SIDE DEVICE

(71) Applicant: VIVO MOBILE COMMUNICATION CO., LTD., Guangdong (CN)

(72) Inventors: Zhenhua Xie, Guangdong (CN); Yanxia Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 355 days.

(21) Appl. No.: 17/994,701

(22) Filed: Nov. 28, 2022

(65) Prior Publication Data
US 2023/0089037 A1    Mar. 23, 2023

Related U.S. Application Data

(63) Continuation of application No. PCT/CN2021/099195, filed on Jun. 9, 2021.

(30) Foreign Application Priority Data

Jun. 9, 2020    (CN) ........................ 202010519756.2

(51) Int. Cl.
    *H04H 20/71*    (2008.01)
    *H04W 28/02*    (2009.01)
    *H04W 72/30*    (2023.01)

(52) U.S. Cl.
    CPC ....... *H04W 72/30* (2023.01); *H04W 28/0268* (2013.01)

(58) Field of Classification Search
    USPC ......................................................... 370/312
    See application file for complete search history.

(56) References Cited

U.S. PATENT DOCUMENTS

| 2016/0374139 A1 | 12/2016 | Chen et al. |
| 2018/0317148 A1* | 11/2018 | Jin ................... H04W 36/0033 |
| 2020/0008109 A1 | 1/2020 | Li et al. |

(Continued)

FOREIGN PATENT DOCUMENTS

| CN | 101515858 A | 8/2009 |
| CN | 104519556 A | 4/2015 |

(Continued)

OTHER PUBLICATIONS

VIVO, KI #1, New Sol: Multicast session leg addition due to UE mobility, SA WG2 Meeting #139E e-meeting, S2-2004105, Jun. 1-12, 2020, Elbonia.

(Continued)

*Primary Examiner* — Chuong T Ho
(74) *Attorney, Agent, or Firm* — Price Heneveld LLP

(57) ABSTRACT

This application discloses a mode switching method, a terminal, and a network-side device. The method may be applied to a target network-side device, and includes: reserving a multicast air interface resource in a case that multicast quality of service QoS information is received from a multicast broadcast network function MB NF, where the multicast air interface resource is used for a terminal to receive multicast service data in a switched-to target mode, and the multicast QoS information corresponds to the multicast service data; and sending the multicast air interface resource to a source network-side device or the MB NF.

20 Claims, 8 Drawing Sheets

(56) References Cited

U.S. PATENT DOCUMENTS

| | | | |
|---|---|---|---|
| 2020/0344576 A1* | 10/2020 | Li | H04W 4/06 |
| 2022/0210690 A1 | 6/2022 | Zhao et al. | |
| 2022/0377507 A1* | 11/2022 | Xie | H04W 4/06 |
| 2023/0179962 A1* | 6/2023 | Qi | H04W 4/06 370/329 |
| 2023/0199439 A1* | 6/2023 | Ma | H04W 28/0268 455/414.1 |
| 2023/0254666 A1* | 8/2023 | Qi | H04W 28/0268 370/329 |
| 2023/0262734 A1* | 8/2023 | Qi | H04L 12/189 455/414.1 |
| 2023/0345310 A1* | 10/2023 | Li | H04W 4/06 |

FOREIGN PATENT DOCUMENTS

| | | |
|---|---|---|
| CN | 1084501271 A | 8/2018 |
| WO | 2021062826 A1 | 4/2021 |

OTHER PUBLICATIONS

CATT, KI #4, New Sol: QoS support for MBS service, SA WG2 Meeting #S2-139E, S2-2004178, Jun. 1-2, 2020, Elbonia.

Huawei, Hisilicon, KI#7, New Solution: Inter-RAN node MBS Session Handover, 3GPP TSG SA2 Meeting #139E, S2-2003966, Jun. 1-12, 2020, Elbonia.

CATT, KI #7 and #8, New Sol: Delivery mode switching using PDU session modification procedures, SA WG2 Meeting #139E (e-meeting), S2-2004179, Jun. 1-12, 2020, Elbonia.

Nokia, Nokia Shanghai Bell, KI #1, new Solution Integrated Multicast and Unicast Transport with multicast distribution tree established by RAN nodes, SA WG2 Meeting #139E, S2-2004279, Electronic meeting, Jun. 1-12, 2020.

NSN, "Potential alternatives for inter-RAT HO signalling latency improvement", R3-131768, 3GPP TSG-RAN WG3 Meeting #81bis, Oct. 7-11, 2013, Venice, Italy.

* cited by examiner

200

Reserve a multicast air interface resource in a case that multicast QoS information is received from an MB NF  ~ S202

Send the multicast air interface resource to a source network-side device or the MB NF  ~ S204

500

Send multicast QoS information to a target network-side device, where the multicast QoS information is used for the target network-side device to reserve a multicast air interface resource ~ S502

Receive a multicast air interface resource, where the multicast air interface resource is reserved by a target network-side device in a case that multicast QoS information is received from an MB NF ~ S602

Receive a multicast air interface resource, where the multicast air interface resource is reserved by a target network-side device in a case that multicast QoS information is received from an MB NF ~ S702

FIG. 7

MODE SWITCHING METHOD, TERMINAL, AND NETWORK-SIDE DEVICE

CROSS-REFERENCE TO RELATED APPLICATIONS

This application is a continuation application of PCT International Application No. PCT/CN2021/099195 filed on Jun. 9, 2021, which claims priority to Chinese Patent Application No. 202010519756.2, filed in China on Jun. 9, 2020, which are incorporated herein by reference in their entireties.

TECHNICAL FIELD

This application pertains to the field of communications technologies, and specifically relates to a mode switching method, a terminal, and a network-side device.

BACKGROUND

A terminal may establish a protocol data unit (PDU) session to a data network (DN) network element through a user plane function (UPF) network element, and the PDU session provides PDU connectivity service between the terminal and the DN network element.

For a terminal using a point-to-point PDU session mode to receive multicast traffic to switch to a target network-side device supporting point-to-multipoint multicast, the terminal has to use a PDU session switching procedure to first switch the PDU session to the target network-side device. If the terminal wants to use the more efficient multicast data transmission mode, a mode switching has to be initiated by the terminal or the target network-side device so as to switch to the point-to-multipoint multicast transmission mode.

It can be learned from the foregoing description that the terminal needs to first switch the PDU session to the target network-side device by using the PDU session switching procedure, and then the terminal or the target network-side device initiates mode switching so as to switch to the point-to-multipoint multicast transmission mode. Such mode switching features relatively low switching efficiency.

SUMMARY

According to a first aspect, a mode switching method is provided, applied to a target network-side device, and the method includes: reserving a multicast air interface resource in a case that multicast quality of service QoS information is received from a multicast broadcast network function MB NF, where the multicast air interface resource is used for a terminal to receive multicast service data in a switched-to target mode, and the multicast QoS information corresponds to the multicast service data; and sending the multicast air interface resource to a source network-side device or the MB NF.

According to a second aspect, a mode switching method is provided, applied to an MB NF, and the method includes: sending multicast QoS information to a target network-side device, where the multicast QoS information is used for the target network-side device to reserve a multicast air interface resource, the multicast air interface resource is used for a terminal to receive multicast service data in a switched-to target mode, and the multicast QoS information corresponds to the multicast service data.

According to a third aspect, a mode switching method is provided, applied to a source network-side device, and the method includes: receiving a multicast air interface resource, where the multicast air interface resource is reserved by a target network-side device in a case that multicast QoS information is received from an MB NF, the multicast air interface resource is used for a terminal to receive multicast service data in a switched-to target mode, and the multicast QoS information corresponds to the multicast service data.

According to a fourth aspect, a mode switching method is provided, applied to a terminal, and the method includes: receiving a multicast air interface resource, where the multicast air interface resource is reserved by a target network-side device in a case that multicast QoS information is received from an MB NF, the multicast air interface resource is used for the terminal to receive multicast service data in a switched-to target mode, and the multicast QoS information corresponds to the multicast service data.

According to a fifth aspect, a mode switching apparatus is provided, and the apparatus includes: a resource reservation module, configured to reserve a multicast air interface resource in a case that multicast quality of service QoS information is received from a multicast broadcast network function MB NF, where the multicast air interface resource is used for a terminal to receive multicast service data in a switched-to target mode, and the multicast QoS information corresponds to the multicast service data; and a sending module, configured to send the multicast air interface resource to a source network-side device or the MB NF.

According to a sixth aspect, a mode switching apparatus is provided, and the apparatus includes: a sending module, configured to send multicast QoS information to a target network-side device, where the multicast QoS information is used for the target network-side device to reserve a multicast air interface resource, the multicast air interface resource is used for a terminal to receive multicast service data in a switched-to target mode, and the multicast QoS information corresponds to the multicast service data.

According to a seventh aspect, a mode switching apparatus is provided, and the apparatus includes: a receiving module, configured to receive a multicast air interface resource, where the multicast air interface resource is reserved by a target network-side device in a case that multicast QoS information is received from an MB NF, the multicast air interface resource is used for a terminal to receive multicast service data in a switched-to target mode, and the multicast QoS information corresponds to the multicast service data.

According to an eighth aspect, a mode switching apparatus is provided, and the apparatus includes: a receiving module, configured to receive a multicast air interface resource, where the multicast air interface resource is reserved by a target network-side device in a case that multicast QoS information is received from an MB NF, the multicast air interface resource is used for the apparatus to receive multicast service data in a switched-to target mode, and the multicast QoS information corresponds to the multicast service data.

According to a ninth aspect, a terminal is provided, where the terminal includes a processor, a memory, and a program or instructions stored in the memory and capable of running on the processor, and when the program or instructions are executed by the processor, the method according to the fourth aspect is implemented.

According to a tenth aspect, a network-side device is provided, where the network-side device includes a processor, a memory, and a program or instructions stored in the memory and capable of running on the processor, and when the program or instructions are executed by the processor, the method according to the first aspect, the second aspect, or the third aspect is implemented.

According to an eleventh aspect, a readable storage medium is provided, where the readable storage medium stores a program or instructions. When the program or instructions are executed by a processor, the method according to the first aspect, the second aspect, the third aspect, or the fourth aspect is implemented.

According to a twelfth aspect, a chip is provided, where the chip includes a processor and a communications interface, the communications interface is coupled to the processor, and the processor is configured to run a program or instructions to implement the method according to the first aspect, the second aspect, the third aspect, or the fourth aspect.

BRIEF DESCRIPTION OF DRAWINGS

FIG. 5 is a schematic flowchart of a mode switching method according to an embodiment of this application;

FIG. 6 is a schematic flowchart of a mode switching method according to an embodiment of this application;

FIG. 7 is a schematic flowchart of a mode switching method according to an embodiment of this application;

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and/or" in this specification and claims indicates at least one of connected objects, and the symbol "/" generally indicates that the associated objects are in an "or" relationship.

It should be noted that techniques described in the embodiments of this application are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to other applications than the NR system application, for example, the sixth generation ($6^{th}$ Generation, 6G) communications system.

Figures 1, 2:
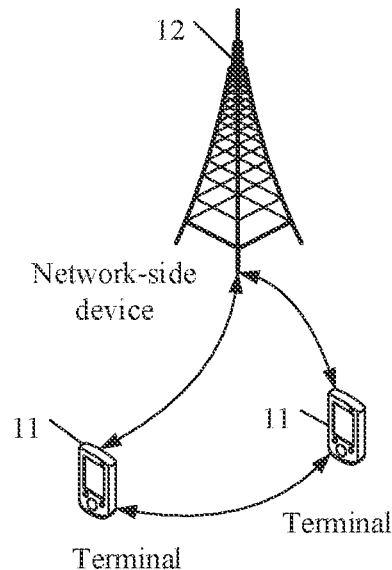
FIG. 1 is a block diagram of a wireless communications system according to an embodiment of this application.
FIG. 2 is a schematic flowchart of a mode switching method according to an embodiment of this application.

FIG. 1 is a block diagram of a wireless communications system to which the embodiments of this application are applicable. The wireless communications system includes a terminal 11 and a network-side device 12. The terminal 11 may also be referred to as a terminal device or a user terminal (User Equipment, UE), and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device or an in-vehicle device (VUE), or a pedestrian terminal (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a WLAN access point, a Wi-Fi node, a transmission reception point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

The following describes in detail a mode switching method, a terminal, and a network-side device provided in the embodiments of this application by using specific embodiments and application scenarios thereof with reference to the accompanying drawings.

As shown in FIG. 2, an embodiment of this application provides a mode switching method 200, and the method may be executed by a target network-side device. In other words, the method may be executed by software or hardware installed in the target network-side device, and the method 200 includes the following steps.

S202: Reserve a multicast air interface resource in a case that multicast quality of service (QoS) information is received from a multicast broadcast network function (MB NF).

The multicast air interface resource is used for a terminal to receive multicast service data in a switched-to target mode. The multicast QoS information corresponds to the multicast service data. In other words, the multicast QoS information is QoS information of the multicast service data.

Before S202, the MB NF may send the multicast QoS information to the target network-side device. Generally, the multicast QoS information differs from "QoS information of a PDU session". In an example, the multicast QoS information sent by the MB NF to the target network-side device may also carry indication information, and the indication information is used to indicate that the multicast QoS information is applied to a multicast service.

It should be noted that the MB NF mentioned in the embodiments of this specification is generally a core network function capable of providing multicast service data; therefore, the MB NF may be replaced with other technical terms, for example, a core network device or a multicast broadcast server.

In this embodiment, in a cell provided by a source network-side device, the terminal may receive a multicast service in a point-to-point PDU session mode. The PDU session mode is based on individual channels, and generally each terminal corresponds to one channel, resulting in relatively low transmission efficiency of the multicast service data. After switching to a cell provided by the target network-side device, the terminal may switch to the target mode, where the target mode may be a point-to-multipoint multicast service transmission mode. For example, when the target network-side device sends one piece of multicast service data, a plurality of terminals are able to receive the multicast service data, which may improve transmission efficiency of the multicast service data in comparison with the PDU session mode. On a basis of the foregoing description, mode switching mentioned in the embodiments of this application may mean that the terminal switches from the PDU session mode of the source network-side device to the target mode of the target network-side device, and the target mode is the point-to-multipoint multicast service transmission mode.

In this embodiment, in an example, before S202, the source network-side device of the terminal may send a handover request message to the target network-side device, and the switch request message may carry identification information of a protocol data unit (PDU) session, for example, a PDU session ID. In this way, after receiving the handover request message, the target network-side device may further send a session update message to the MB NF, and the session update message carries the identification information of the PDU session, for example, the PDU session ID, so that the MB NF may send the multicast QoS information to the target network-side device.

In this embodiment, in another example, before S202, the source network-side device of the terminal may send a handover notification message to the MB NF, and the handover notification message may carries the identification information of the PDU session, for example, the PDU session ID. In this way, the MB NF may send the multicast QoS information to the target network-side device after receiving the handover notification message.

S204: Send the multicast air interface resource to the source network-side device or the MB NF.

In this embodiment, in a case that the target network-side device sends the multicast air interface resource to the source network-side device, the source network-side device may further forward the multicast air interface resource to the terminal; or in a case that the target network-side device sends the multicast air interface resource to the MB NF, the MB NF may further forward the multicast air interface resource to the terminal through the source network-side device. In this way, the terminal may hand over to the target network-side device by using the multicast air interface resource, and receives the multicast service data in a switched-to target mode.

In an example, the target network-side device may send a handover command to the source network-side device, where the handover command carries the multicast air interface resource; and the source network-side device may further send, to the terminal, a handover command that carries the multicast air interface resource. In this way, the terminal may further access the target network-side device based on the multicast air interface resource, and sends to the target network-side device a handover completion message, for example, a Handover Confirm message.

In another example, the target network-side device may send the multicast air interface resource to the MB NF, and the MB NF sends a handover command (for example, a Handover Command message) to the source network-side device, where the handover command carries the multicast air interface resource. The source network-side device may further send, to the terminal, a handover command that carries the multicast air interface resource. In this way, the terminal may further access the target network-side device based on the multicast air interface resource, and sends to the target network-side device a handover completion message, for example, a Handover Confirm message.

According to the mode switching method provided in this embodiment of this application, in the case of receiving the multicast QoS information from the MB NF, the target network-side device reserves the multicast air interface resource, and sends the multicast air interface resource to the source network-side device or the MB NF, so that the terminal can switch from a PDU session mode to the target mode and receives the multicast service data by using the multicast air interface resource, thereby improving switching efficiency of mode switching.

With respect to the improved efficiency of mode switching, in a related art, the terminal needs to first perform PDU session switching, and then switches from the PDU session to the target mode, and an air interface resource required for PDU session switching differs from an air interface resource required for the target mode. In this way, the target network-side device needs to not only reserve the air interface resource required for the PDU session but also reserve the air interface resource required for the target mode, and also needs to exchange signaling with the source network-side device, the terminal, and the like to notify the air interface resources, resulting in relatively low switching efficiency. In this embodiment of this application, there is no need to reserve the air interface resource required for PDU session switching, and a signaling exchange procedure required for notifying the air interface resources is omitted, thereby improving switching efficiency of mode switching.

Optionally, before S202 of the embodiment 200, the method further includes: receiving the identification information of the PDU session from the source network-side device; and sending the identification information of the PDU session to the MB NF. The PDU session mentioned in this example may also be referred to as a to-be-switched PDU session because the terminal is about to switch from the PDU session mode to the target mode. After receiving the identification information of the PDU session, the MB NF may learn that the terminal needs to perform mode switching, that is, the multicast QoS information can be sent to the target network-side device.

In this embodiment, after sending the identification information of the PDU session to the MB NF, the target network-side device may further receive, from the MB NF, at least one of the following: a QoS parameter corresponding to the PDU session, and multicast information. The multicast information, for example, includes at least one of a temporary mobile group identity (TMGI) and an identifier of the MB NF.

Optionally, before S202 of the embodiment 200, the method further includes: receiving, from the source network-side device, at least one of the following: a mode switching indication and the target mode. In an example, the mode switching indication includes a specific QoS flow identifier. In this embodiment, the source network-side device may send at least one of the mode switching indication and the target mode to the target network-side device, so as to indicate that the terminal needs to perform mode switching. In this way, the target network-side device may send a session update message to the MB NF, and after receiving the session update message, the MB NF may learn that the terminal needs to perform mode switching, that is, the multicast QoS information can be sent to the target network-side device.

Optionally, before S202 of the embodiment 200, the method further includes: receiving, from the MB NF, at least one of the following: a mode switching indication, the target mode, a QoS parameter corresponding to the PDU session, and multicast information.

In the foregoing plurality of examples, in a case that the target network-side device receives the QoS parameter corresponding to the PDU session, the target network-side device may further reserve an air interface resource for the PDU session. In this way, the terminal can not only receive the multicast service data in the target mode, and also receive the multicast service data in the PDU session mode. This embodiment is applicable to a scenario where the terminal needs to receive a plurality of different types of multicast service data, so as to meet transmission requirements of a plurality of different multicast service data and also help improve transmission efficiency.

Optionally, the embodiment 200 further includes the following step: sending to the MB NF at least one of the following: an air interface resource for a PDU session, and a multicast downlink tunnel resource for receiving the multicast service data.

In this embodiment, in a case that the air interface resource for the PDU session is sent to the MB NF, the MB NF may further send the air interface resource for the PDU session to the terminal through the source network-side device, so that the terminal subsequently receives the multicast service data from the target network-side device in the PDU session mode.

In this embodiment, in a case that the multicast downlink tunnel resource is sent to the MB NF, the target network-side device may further receive the multicast service data by using the multicast downlink tunnel resource and sends the multicast service data to the terminal by using the multicast air interface resource, so that the terminal may receive the multicast service data in the target mode by using the multicast air interface resource.

Figure 3:
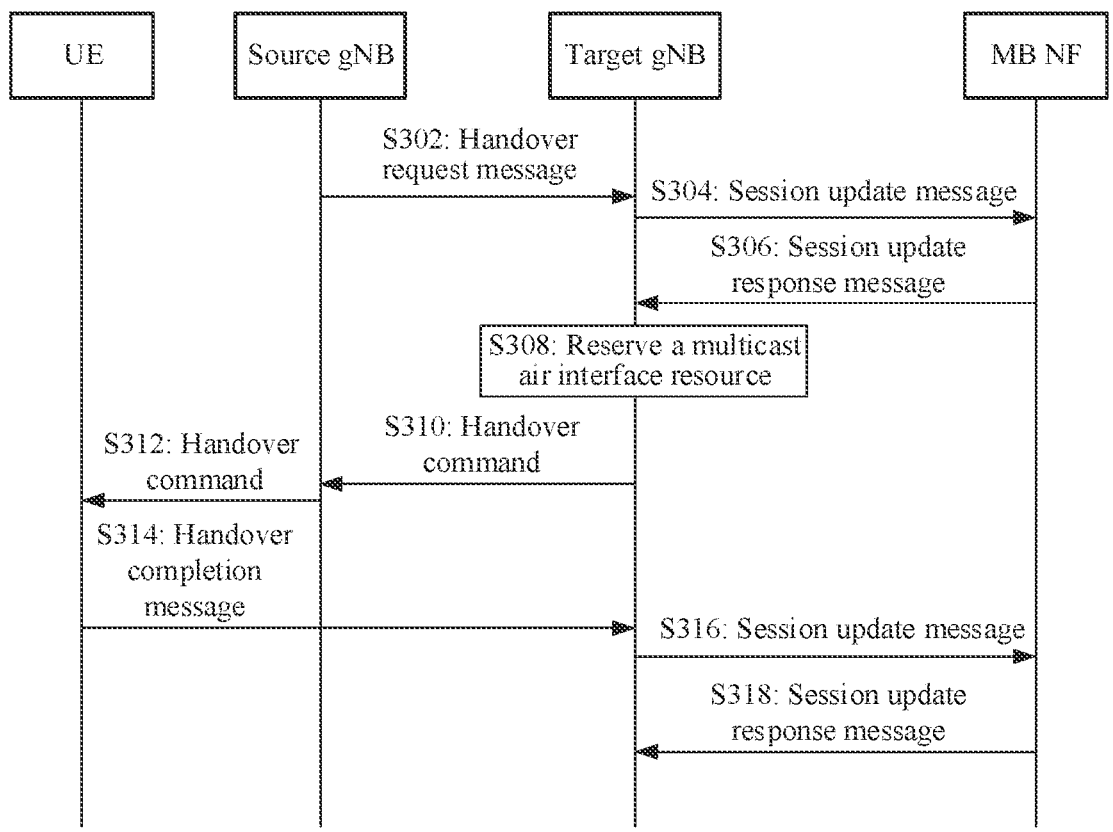
FIG. 3 is a schematic flowchart of a mode switching method according to an embodiment of this application.
Figure 4:
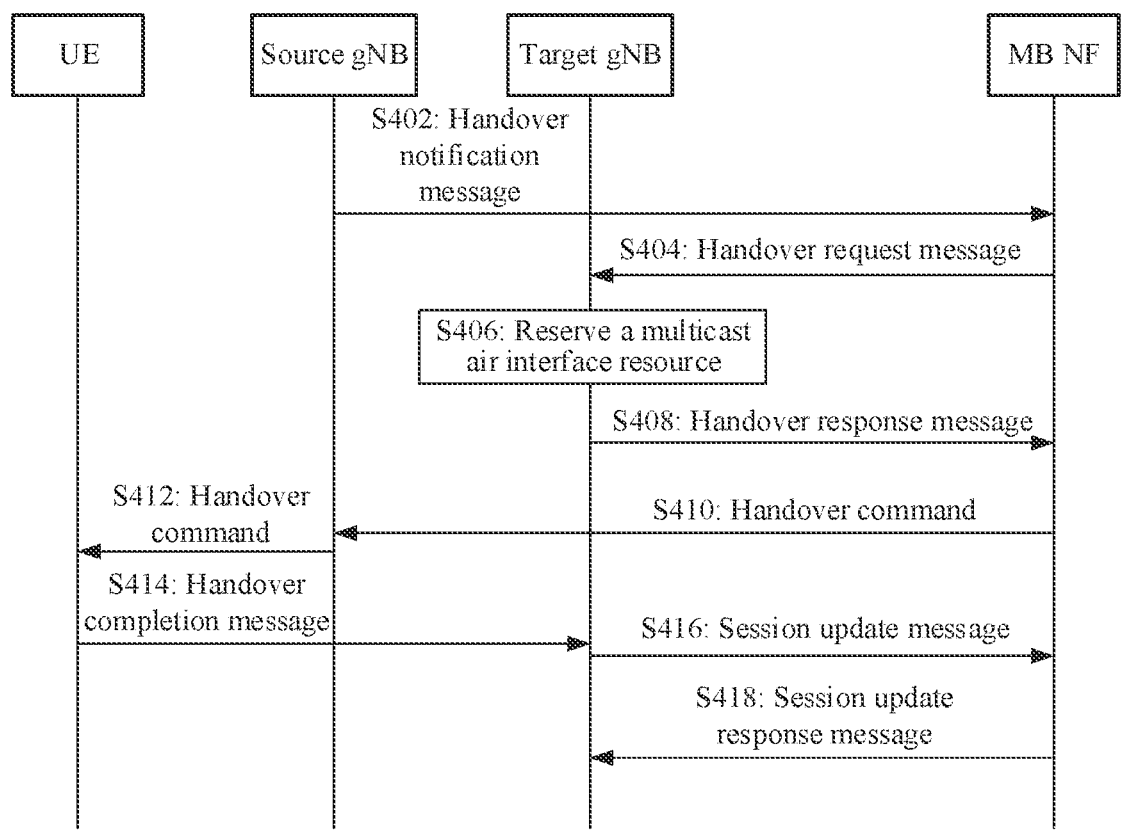
FIG. 4 is a schematic flowchart of a mode switching method according to an embodiment of this application.

The following describes in detail the mode switching method provided by the embodiments of this application with reference to two specific embodiments in FIG. 3 and FIG. 4. In the embodiments shown in FIG. 3 and FIG. 4, the source network-side device being a source gNB and the target network-side device being a target gNB are used as examples for description.

Embodiment 1

As shown in FIG. 3, Embodiment 1 includes the following steps:

S302: The source gNB sends a handover request message, for example, a Handover Request message, to the target gNB, where the handover request message carries identification information of a PDU session, for example, a PDU session ID.

Optionally, the handover request message may also carry a mode switching indication that may be used to indicate that a terminal needs to perform mode switching; and the handover request message may also indicate a target mode. Optionally, the source gNB may use a specific QoS flow identifier to identify that the terminal needs to perform mode switching.

S304: The target gNB sends a session update message to an MB NF according to the mode switching indication.

For example, when the MB NF is a session management function (SMF), the target gNB sends the session update message to the SMF through an access and mobility management function (AMF); or when the MB NF is an AMF, the target gNB directly sends the session update message to the AMF. The session update message may carry identification information of a to-be-switched PDU session, for example, a PDU session ID.

S306: The MB NF sends a session update response message to the target gNB.

In this embodiment, based on the PDU session ID, the MB NF matches information such as a TMGI, a corresponding QoS parameter, or a packet filtering rule of a multicast service that is being received by a user through the PDU session; and based on the QoS information corresponding to the PDU session and the packet filtering rule, adjusts the QoS information of the PDU session, for example, deletes a flow. The session update response message carries multicast QoS information obtained through adjustment, for example, a QoS parameter corresponding to the multicast service, and may also carry a QoS parameter (which may have been adjusted) corresponding to the PDU session; or the session update response message may also carry multicast information, for example, a TMGI and/or an identifier of the MB NF.

S308: The target gNB reserves a multicast air interface resource based on the multicast QoS information.

Optionally, the target gNB may further reserve an air interface resource for the PDU session based on the QoS parameter of the PDU session.

S310: The target gNB returns, to the source gNB, a handover command, for example, a Handover Response message, carrying an air interface resource. The air interface resource includes the multicast air interface resource, and may also include the air interface resource for the PDU session.

S312: The source gNB forwards the air interface resource to the terminal UE by using a handover command.

S314: The UE accesses the target gNB based on the multicast air interface resource, and sends, to the target gNB, a handover completion message, for example, a Handover Confirm message.

S316: The target gNB sends, to the MB NF, a session update message that may carry the received multicast information and may also carry multicast downlink tunnel resource information.

S318: The MB NF returns a session update response message to the target gNB.

In this case, the MB NF (for example, a UPF) may send multicast service data to the target gNB by using the multicast downlink tunnel resource, and the target gNB may send the multicast service data to the UE by using the multicast air interface resource.

Embodiment 2

As shown in FIG. 4, this embodiment includes the following steps:

S402: A source gNB sends a handover notification message to an MB NF. For example, when the MB NF is an SMF, the source gNB sends the handover notification message to the SMF through an AMF; or when the MB NF is an AMF, the source gNB directly sends the handover notification message to the AMF, where the handover notification message (for example, a Handover Required message) may carry identification information of a to-be-switched PDU session, for example, a PDU session ID.

S404: The MB NF sends, to a target gNB, a handover request message, for example, a Handover Request message.

Based on the PDU session ID, the MB NF matches information such as a TMGI, a corresponding QoS parameter, or a packet filtering rule of a multicast service that is being received by a user through the PDU session; and based on QoS information corresponding to the PDU session and the packet filtering rule, adjusts the QoS information of the PDU session, for example, deletes a flow.

The handover request message may carry a mode switching indication that may indicate mode switching or may indicate a target mode, and specifically, a mode switching indication may also be indicated by using a multicast QoS parameter. The handover request message also carries QoS information obtained through adjustment, for example, multicast QoS information corresponding to the multicast service, and may also carry a QoS parameter (which may have been adjusted) corresponding to the PDU session. The handover request message may also carry multicast information, for example, a TMGI and/or an identifier of the MB NF.

S406: The target gNB reserves a multicast air interface resource, and may also reserve an air interface resource for the PDU session based on the QoS parameter of the PDU session.

In this step, the target gNB may reserve the multicast air interface resource based on the mode switching indication and the multicast QoS information, or may reserve the multicast air interface resource only based on the multicast QoS information.

S408: The target gNB returns, to the MB NF, a handover response message, for example, a Handover Response message, carrying an air interface resource (which includes the multicast air interface resource, or may further includes the air interface resource for the PDU session if a flow is present in the PDU session) to be sent to the source gNB; and the target gNB may further reserve a multicast downlink tunnel resource for multicast service data that is used for sending the multicast service data to the target gNB by the MB NF.

S410: The MB NF sends, to the source gNB, a handover command, for example, a Handover Command message, carrying an air interface resource. The air interface resource includes the multicast air interface resource, and may also include the air interface resource for the PDU session.

S412: The source gNB forwards the air interface resource to a terminal UE.

S414: The UE accesses the target gNB based on the multicast air interface resource, and sends, to the target gNB, a handover completion message, for example, a Handover Confirm message.

S416: The target gNB sends, to the MB NF, a session update message that may carry the received multicast information, where the multicast downlink tunnel resource information is sent in this step S416 if not yet being sent in step S408.

S418: The MB NF returns a session update response message to the target gNB.

In this case, the MB NF (for example, a UPF) may send multicast service data to the target gNB by using the multicast downlink tunnel resource, and the target gNB may send the multicast service data to the UE by using the multicast air interface resource.

The foregoing describes in detail the mode switching method in this embodiment of this application with reference to FIG. 2 to FIG. 4. The following describes in detail the mode switching method in several other embodiments of this application with reference to FIG. 5 to FIG. 7. It can be understood that descriptions on the MB NF side, the source network-side device side, and the terminal side are the same as the description of the method shown in FIG. 2 to FIG. 4 on the target network-side device side. To avoid repetition, related descriptions are appropriately omitted.

FIG. 5 is a schematic implementation flowchart of a mode switching method according to this embodiment of this application, and the method is applicable to the MB NF side. As shown in FIG. 5, the method 500 includes the following steps:

S502: Send multicast QoS information to a target network-side device, where the multicast QoS information is used for the target network-side device to reserve a multicast air interface resource.

The multicast air interface resource is used for a terminal to receive multicast service data in a switched-to target mode, and the multicast QoS information corresponds to the multicast service data.

In this embodiment of this application, in the case of receiving the multicast QoS information from the MB NF, the target network-side device reserves the multicast air interface resource, and sends the multicast air interface resource to a source network-side device or the MB NF, so that the terminal can switch from a PDU session mode to the target mode and receives the multicast service data by using the multicast air interface resource, thereby improving switching efficiency of mode switching.

Optionally, in an embodiment, the method further includes: receiving the multicast air interface resource.

Optionally, in an embodiment, the method further includes: receiving identification information of a PDU session from the target network-side device, where the identification information of the PDU session is sent by the source network-side device to the target network-side device.

Optionally, in an embodiment, the method further includes: sending to the target network-side device at least one of the following: a QoS parameter corresponding to the PDU session; and multicast information.

Optionally, in an embodiment, the method further includes: sending to the target network-side device at least one of the following:

a mode switching indication;

the target mode;

a QoS parameter corresponding to the PDU session; and multicast information.

Optionally, in an embodiment, the method further includes: receiving, from the target network-side device, at least one of the following: an air interface resource for a PDU session, and a multicast downlink tunnel resource for sending the multicast service data.

Optionally, in an embodiment, the method further includes: sending the multicast service data by using the multicast downlink tunnel resource.

FIG. 6 is a schematic implementation flowchart of a mode switching method according to this embodiment of this application, and the method is applicable to the source network-side device side. As shown in FIG. 6, the method 600 includes the following steps:

S602: Receive a multicast air interface resource, where the multicast air interface resource is reserved by a target network-side device in a case that multicast QoS information is received from an MB NF.

The multicast air interface resource is used for a terminal to receive multicast service data in a switched-to target mode, and the multicast QoS information corresponds to the multicast service data.

In this embodiment of this application, a source network-side device receives the multicast air interface resource, where the multicast air interface resource is reserved by the target network-side device in the case that the multicast QoS information is received from the MB NF, and the source network-side device may further send the multicast air interface resource to the terminal, so that the terminal can switch from a PDU session mode to the target mode and receives the multicast service data by using the multicast air interface resource, thereby improving switching efficiency of mode switching.

Optionally, in an embodiment, the method further includes: sending identification information of a PDU session to the target network-side device. FIG. 7 is a schematic implementation flowchart of a mode switching method according to this embodiment of this application, and the method is applicable to the terminal side. As shown in FIG. 7, the method 700 includes the following steps:

S702: Receive a multicast air interface resource, where the multicast air interface resource is reserved by a target network-side device in a case that multicast QoS information is received from an MB NF.

The multicast air interface resource is used for the terminal to receive multicast service data in a switched-to target mode, and the multicast QoS information corresponds to the multicast service data.

In this embodiment of this application, the terminal receives the multicast air interface resource, where the multicast air interface resource is reserved by the target network-side device in the case that the multicast QoS information is received from the MB NF, so that the terminal can switch from a PDU session mode to the target mode and receives the multicast service data by using the multicast air interface resource, thereby improving switching efficiency of mode switching.

It should be noted that, for the mode switching method provided by the embodiments of this application, the execution body may be a mode switching apparatus, or a control module for executing the mode switching method in the mode switching apparatus. In the embodiments of this application, the mode switching apparatus provided in the embodiments of this application is described by using the mode switching method being executed by the mode switching apparatus as an example.

Figure 8:
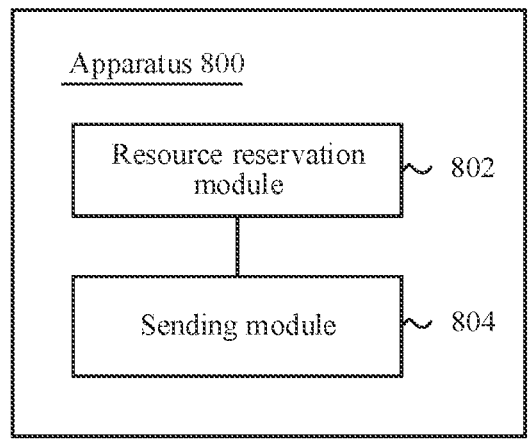
FIG. 8 is a schematic structural diagram of a mode switching apparatus according to an embodiment of this application.

FIG. 8 is a schematic structural diagram of a mode switching apparatus according to an embodiment of this application. The apparatus corresponds to the target network-side device described in the foregoing embodiments. As shown in FIG. 8, the apparatus 800 includes:

a resource reservation module 802, configured to reserve a multicast air interface resource in a case that multicast QoS information is received from an MB NF, where the multicast air interface resource is used for a terminal to receive multicast service data in a switched-to target mode, and the multicast QoS information corresponds to the multicast service data; and a sending module 804, configured to send the multicast air interface resource to a source network-side device or the MB NF.

In this embodiment of this application, in the case of receiving the multicast QoS information from the MB NF, the target network-side device reserves the multicast air interface resource, and sends the multicast air interface resource to the source network-side device or the MB NF, so that the terminal can switch from a PDU session mode to the target mode and receives the multicast service data by using the multicast air interface resource, thereby improving switching efficiency of mode switching.

Optionally, in an embodiment, the apparatus 800 further includes a receiving module, configured to receive identification information of a protocol data unit PDU session from the source network-side device; and the sending module 804 may be configured to send the identification information of the PDU session to the MB NF.

Optionally, in an embodiment, the apparatus 800 further includes a receiving module, configured to receive, from the source network-side device, at least one of the following:

a mode switching indication; and the target mode.

Optionally, in an embodiment, the mode switching indication includes a specific QoS flow identifier.

Optionally, in an embodiment, the apparatus 800 further includes a receiving module, configured to receive, from the MB NF, at least one of the following:

a QoS parameter corresponding to the PDU session; and multicast information.

Optionally, in an embodiment, the apparatus 800 further includes a receiving module, configured to receive, from the MB NF, at least one of the following:

a mode switching indication;

the target mode;

a QoS parameter corresponding to the PDU session; and multicast information.

Optionally, in an embodiment, in a case that the QoS parameter corresponding to the PDU session is received, the resource reservation module 802 may be configured to reserve an air interface resource for the PDU session.

Optionally, in an embodiment, the sending module 804 may be configured to send to the MB NF at least one of the following:

an air interface resource for a PDU session; and a multicast downlink tunnel resource for receiving the multicast service data.

Optionally, in an embodiment, the apparatus 800 further includes a receiving module, configured to receive the multicast service data by using the multicast downlink tunnel resource. The sending module 804 may be configured to send the multicast service data to the terminal by using the multicast air interface resource.

Figure 9:
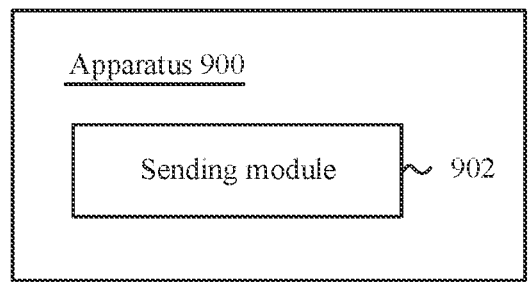
FIG. 9 is a schematic structural diagram of a mode switching apparatus according to an embodiment of this application.

FIG. 9 is a schematic structural diagram of a mode switching apparatus according to an embodiment of this application. The apparatus corresponds to the MB NF described in the foregoing embodiments. As shown in FIG. 9, the apparatus 900 includes:

a sending module 902, configured to send multicast QoS information to a target network-side device, where the multicast QoS information is used for the target network-side device to reserve a multicast air interface resource, the multicast air interface resource is used for a terminal to receive multicast service data in a switched-to target mode, and the multicast QoS information corresponds to the multicast service data.

In this embodiment of this application, in the case of receiving the multicast QoS information from the MB NF, the target network-side device reserves the multicast air interface resource, and sends the multicast air interface resource to a source network-side device or the MB NF, so that the terminal can switch from a PDU session mode to the target mode and receives the multicast service data by using the multicast air interface resource, thereby improving switching efficiency of mode switching.

Optionally, in an embodiment, the apparatus 900 further includes a receiving module, configured to receive the multicast air interface resource.

Optionally, in an embodiment, the apparatus 900 further includes a receiving module, configured to receive identification information of a PDU session from the target network-side device, where the identification information of the PDU session is sent by the source network-side device to the target network-side device.

Optionally, in an embodiment, the sending module 902 may be configured to send to the target network-side device at least one of the following: a QoS parameter corresponding to the PDU session; and multicast information.

Optionally, in an embodiment, the sending module 902 may be configured to send to the target network-side device at least one of the following:

a mode switching indication;
the target mode;
a QoS parameter corresponding to the PDU session; and
multicast information.

Optionally, in an embodiment, the apparatus 900 further includes a receiving module, configured to receive, from the target network-side device, at least one of the following: an air interface resource for a PDU session, and a multicast downlink tunnel resource for sending the multicast service data.

Optionally, in an embodiment, the sending module 902 may be configured to send the multicast service data by using the multicast downlink tunnel resource.

Figure 10:
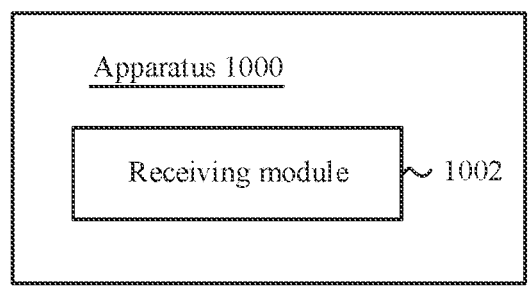
FIG. 10 is a schematic structural diagram of a mode switching apparatus according to an embodiment of this application.

FIG. 10 is a schematic structural diagram of a mode switching apparatus according to an embodiment of this application. The apparatus corresponds to the source network-side device described in the foregoing embodiments. As shown in FIG. 10, the apparatus 1000 includes:

a receiving module 1002, configured to receive a multicast air interface resource, where the multicast air interface resource is reserved by a target network-side device in a case that multicast QoS information is received from an MB NF, the multicast air interface resource is used for a terminal to receive multicast service data in a switched-to target mode, and the multicast QoS information corresponds to the multicast service data.

In this embodiment of this application, the mode switching apparatus receives the multicast air interface resource, where the multicast air interface resource is reserved by the target network-side device in the case that the multicast QoS information is received from the MB NF, and the mode switching apparatus may further send the multicast air interface resource to the terminal, so that the terminal can switch from a PDU session mode to the target mode and receives the multicast service data by using the multicast air interface resource, thereby improving switching efficiency of mode switching.

Optionally, in an embodiment, the apparatus 1000 includes a sending module, configured to send identification information of a PDU session to the target network-side device.

Figure 11:
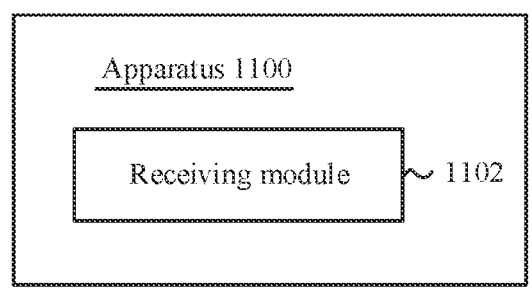
FIG. 11 is a schematic structural diagram of a mode switching apparatus according to an embodiment of this application.

FIG. 11 is a schematic structural diagram of a mode switching apparatus according to an embodiment of this application. The apparatus corresponds to the terminal described in the foregoing embodiments. As shown in FIG. 11, the apparatus 1100 includes:

a receiving module 1102, configured to receive a multicast air interface resource, where the multicast air interface resource is reserved by a target network-side device in a case that multicast QoS information is received from an MB NF, the multicast air interface resource is used for the apparatus to receive multicast service data in a switched-to target mode, and the multicast QoS information corresponds to the multicast service data.

In this embodiment of this application, the mode switching apparatus receives the multicast air interface resource, where the multicast air interface resource is reserved by the target network-side device in the case that the multicast QoS information is received from the MB NF, so that the mode switching apparatus, for example, the terminal, can switch from a PDU session mode to the target mode and receives the multicast service data by using the multicast air interface resource, thereby improving switching efficiency of mode switching.

The mode switching apparatus in this embodiment of this application may be an apparatus, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The mode switching apparatus in this embodiment of this application may be an apparatus with an operating system. The operating system may be an Android operating system, an iOS operating system, or other possible operating systems, and is not specifically limited in the embodiments of this application.

The mode switching apparatus provided in this embodiment of this application is capable of implementing the processes implemented in the method embodiments in FIG. 2 to FIG. 7, with the same technical effects achieved. To avoid repetition, details are not described herein again.

Figure 12:
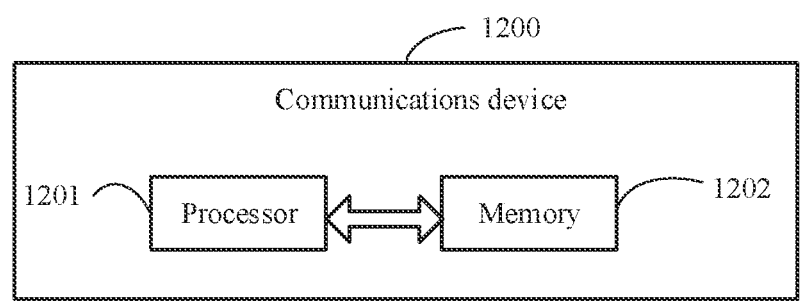
FIG. 12 is a schematic structural diagram of a communications device according to an embodiment of this application.

Optionally, as shown in FIG. 12, an embodiment of this application further provides a communications device 1200, including a processor 1201, a memory 1202, and a program or instructions stored in the memory 1202 and capable of running on the processor 1201. For example, when the communications device 1200 is a terminal and when the program or instructions are executed by the processor 1201, the processes of the foregoing embodiment of the mode switching method are implemented, with the same technical effects achieved. When the communications device 1200 is a network-side device and when the program or instructions are executed by the processor 1201, the processes of the foregoing embodiment of the mode switching method are implemented, with the same technical effects achieved. To avoid repetition, details are not described herein again.

Figure 13:
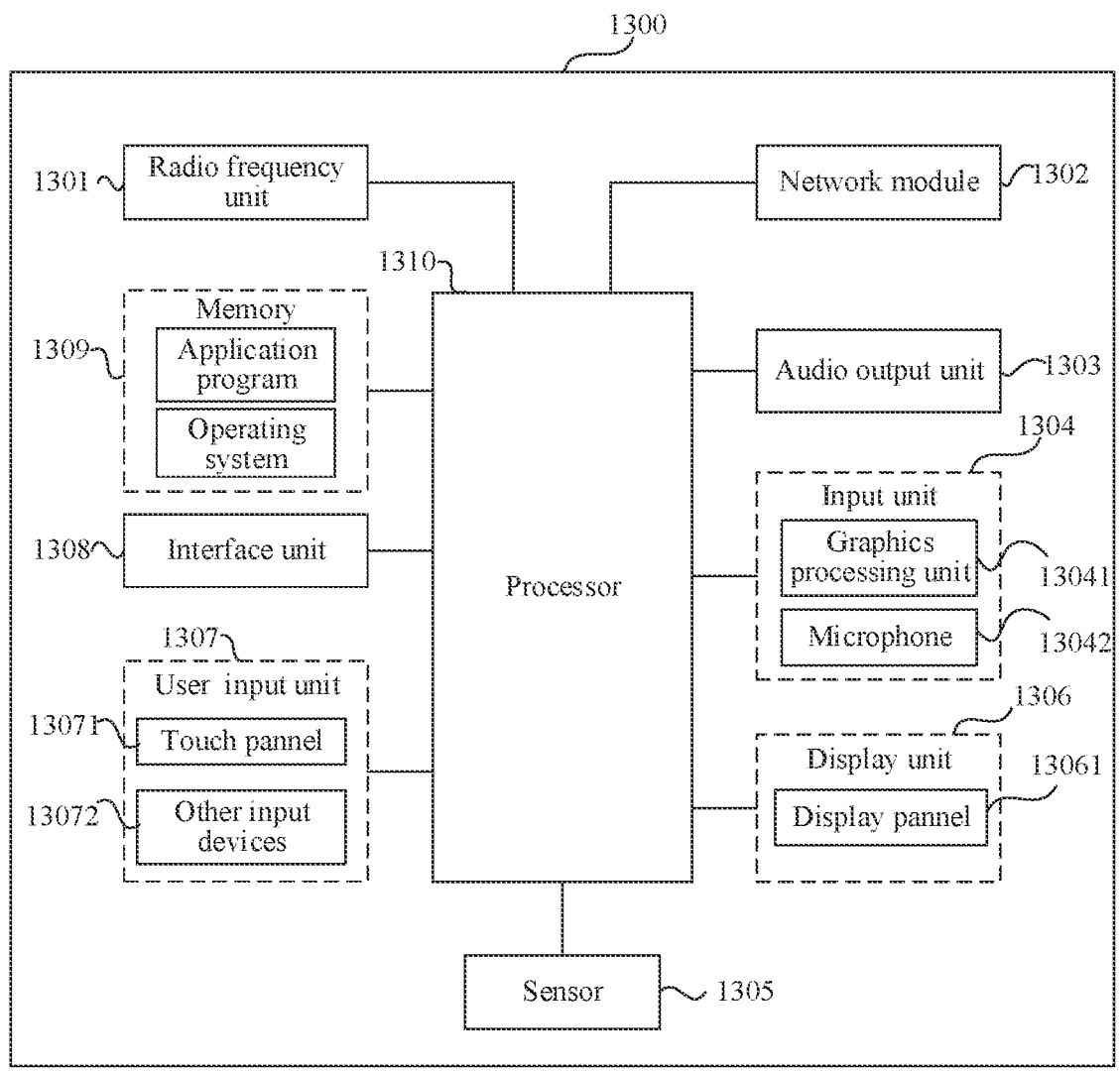
FIG. 13 is a schematic structural diagram of a terminal according to an embodiment of this application.

FIG. 13 is a schematic diagram of a hardware structure of a terminal for implementing the embodiments of this application.

The terminal 1300 includes but is not limited to components such as a radio frequency unit 1301, a network module 1302, an audio output unit 1303, an input unit 1304, a sensor 1305, a display unit 1306, a user input unit 1307, an interface unit 1308, a memory 1309, and a processor 1310.

Persons skilled in the art can understand that the terminal 1300 may further include a power supply (for example, a battery) supplying power to the components, and the power supply may be logically connected to the processor 1310 through a power management system. In this way, functions such as charge management, discharge management, and power consumption management are implemented by using the power management system. The structure of the terminal shown in FIG. 13 does not constitute any limitation on the terminal. The terminal may include more or fewer components than shown in FIG. 13, or a combination of some components, or the components disposed differently. Details are not described herein again.

It can be understood that in this embodiment of this application, the input unit 1304 may include a graphics processing unit (GPU) 13041 and a microphone 13042. The graphics processing unit 13041 processes image data of a still picture or video obtained by an image capture apparatus (such as a camera) in a video capture mode or an image capture mode. The display unit 1306 may include a display panel 13061, and the display panel 13061 may be configured in a form of a liquid crystal display, an organic light-emitting diode, and the like. The user input unit 1307 may include a touch panel 13071 and other input devices 13072. The touch panel 13071 is also referred to as a touchscreen. The touch panel 13071 may include two parts: a touch detection apparatus and a touch controller. The other input devices 13072 may include but are not limited to a physical keyboard, a function key (such as a volume control key or a power on/off key), a trackball, a mouse, a joystick, and the like. Details are not described herein.

In this embodiment of this application, the radio frequency unit 1301 receives downlink data from a network-side device, and then sends the downlink data to the processor 1310 for processing; and also sends uplink data to the network-side device. Generally, the radio frequency unit 1301 includes but is not limited to an antenna, at least one amplifier, a transceiver, a coupler, a low noise amplifier, a duplexer, and the like.

The memory 1309 may be configured to store software programs or instructions and various data. The memory 1309 may mainly include a program or instruction storage area and a data storage area. The program or instruction storage area may store an operating system, an application program or instruction required by at least one function (for example, a sound playback function or an image playback function), and the like. In addition, the memory 1309 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another volatile solid-state storage device.

The processor 1310 may include one or more processing units. Optionally, an application processor and a modem processor may be integrated in the processor 1310. The application processor primarily processes an operating system, user interfaces, application programs or instructions, and the like. The modem processor primarily processes radio communication, for example, being a baseband processor. It can be understood that the modem processor may alternatively be not integrated in the processor 1310.

The radio frequency unit 1301 is configured to receive a multicast air interface resource, where the multicast air interface resource is reserved by a target network-side device in a case that multicast QoS information is received from an MB NF.

The multicast air interface resource is used for the terminal to receive multicast service data in a switched-to target mode, and the multicast QoS information corresponds to the multicast service data.

In this embodiment of this application, the terminal receives the multicast air interface resource, where the multicast air interface resource is reserved by the target network-side device in the case that the multicast QoS information is received from the MB NF, so that the terminal can switch from a PDU session mode to the target mode and receives the multicast service data by using the multicast air interface resource, thereby improving switching efficiency of mode switching.

Figure 14:
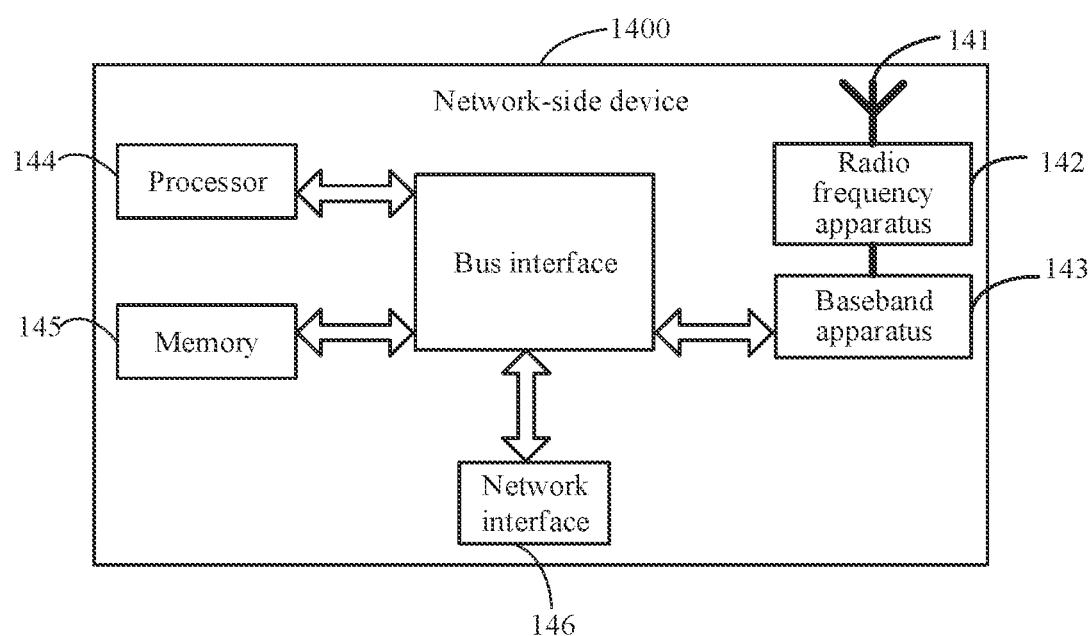
FIG. 14 is a schematic structural diagram of a network-side device according to an embodiment of this application.

Specifically, an embodiment of this application further provides a network-side device. As shown in FIG. 14, the network-side device 1400 includes an antenna 141, a radio frequency apparatus 142, and a baseband apparatus 143. The antenna 141 is connected to the radio frequency apparatus 142. In an uplink direction, the radio frequency apparatus 142 receives information by using the antenna 141, and sends the received information to the baseband apparatus 143 for processing. In a downlink direction, the baseband apparatus 143 processes to-be-sent information, and sends the information to the radio frequency apparatus 142; and the radio frequency apparatus 142 processes the received information and then sends the information out by using the antenna 141.

The radio frequency apparatus 142 may be located in the baseband apparatus 143. The method performed by the network-side device in the foregoing embodiments may be implemented in the baseband apparatus 143, and the baseband apparatus 143 includes a processor 144 and a memory 145.

The baseband apparatus 143 may include, for example, at least one baseband processing unit, where a plurality of chips are disposed on the baseband processing unit. As shown in FIG. 14, one of the chips is, for example, the processor 144, and is connected to the memory 145, to invoke a program in the memory 145 to perform the operation of the network-side device shown in the foregoing method embodiment.

The baseband apparatus 143 may further include a network interface 146, configured to exchange information with the radio frequency apparatus 142, where the interface is, for example, a common public radio interface (CPRI).

Specifically, the network-side device in this embodiment of the present invention further includes: an instruction or a program stored in the memory 145 and capable of running on the processor 144. The processor 144 invokes the instruction or program in the memory 145 to execute the method executed by the modules shown in FIG. 2 to FIG. 6, with the same technical effects achieved. To avoid repetition, details are not repeated herein.

An embodiment of this application further provides a readable storage medium, where the readable storage medium stores a program or instructions. When the program or instructions are executed by a processor, the processes of the foregoing embodiments of the mode switching method can be implemented, with the same technical effects achieved. To avoid repetition, details are not described herein again.

The processor is a processor in the terminal described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions to implement the processes of the foregoing embodiments of the mode switching method, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A mode switching method, performed by a target network-side device, wherein the method comprises:
reserving a multicast air interface resource in a case that multicast quality of service (Qos) information is received from a multicast broadcast network function (MB NF), wherein the multicast air interface resource is used for receiving multicast service data in a switched-to target mode after a mode switching, and the multicast QoS information corresponds to the multicast service data; and
sending the multicast air interface resource to a source network-side device or the MB NF,
wherein the mode switching comprises that a terminal switches from a point-to-point protocol data unit (PDU) session mode of a source network-side device to the target mode of the target network-side device, and wherein the target mode is a point-to-multipoint multicast service transmission mode.

2. The method according to claim 1, wherein before the reserving a multicast air interface resource, the method further comprises:
receiving identification information of a PDU session from the source network-side device; and
sending the identification information of the PDU session to the MB NF.

3. The method according to claim 1, wherein before the reserving a multicast air interface resource, the method further comprises: receiving, from the source network-side device, at least one of the following:
a mode switching indication; and
the target mode.

4. The method according to claim 3, wherein the mode switching indication comprises a specific QoS flow identifier.

5. The method according to claim 2, wherein the method further comprises: receiving, from the MB NF, at least one of the following:
a QoS parameter corresponding to the PDU session; and
multicast information.

6. The method according to claim 1, wherein before the reserving a multicast air interface resource, the method further comprises: receiving, from the MB NF, at least one of the following:
a mode switching indication;
the target mode;
a QoS parameter corresponding to the PDU session; and
multicast information.

7. The method according to claim 5, wherein in a case that the QoS parameter corresponding to the PDU session is received, the method further comprises:
reserving an air interface resource for the PDU session.

8. The method according to claim 1, wherein the method further comprises: sending to the MB NF at least one of the following:
- an air interface resource for a PDU session; and
- a multicast downlink tunnel resource for receiving the multicast service data.

9. The method according to claim 8, wherein the method further comprises:
- receiving the multicast service data by using the multicast downlink tunnel resource; and
- sending the multicast service data to the terminal by using the multicast air interface resource.

10. A mode switching method, performed by an MB NF, wherein the method comprises:
- sending multicast QoS information to a target network-side device, wherein the multicast QoS information is used for reserving a multicast air interface resource, the multicast air interface resource is used for receiving multicast service data in a switched-to target mode after a mode switching, and the multicast QoS information corresponds to the multicast service data,
- wherein the mode switching comprises that a terminal switches from a point-to-point PDU session mode of a source network-side device to the target mode of the target network-side device, and wherein the target mode is a point-to-multipoint multicast service transmission mode.

11. The method according to claim 10, wherein the method further comprises:
- receiving the multicast air interface resource.

12. The method according to claim 10, wherein the method further comprises:
- receiving identification information of a PDU session from the target network-side device, wherein the identification information of the PDU session is sent by a source network-side device to the target network-side device.

13. The method according to claim 12, wherein the method further comprises: sending to the target network-side device at least one of the following:
- a QoS parameter corresponding to the PDU session; and
- multicast information.

14. The method according to claim 10, wherein the method further comprises: sending to the target network-side device at least one of the following:
- a mode switching indication;
- the target mode;
- a QoS parameter corresponding to the PDU session; and
- multicast information.

15. The method according to claim 10, wherein the method further comprises: receiving, from the target network-side device, at least one of the following:
- an air interface resource for a PDU session; and
- a multicast downlink tunnel resource for sending the multicast service data.

16. The method according to claim 15, wherein the method further comprises:
- sending the multicast service data by using the multicast downlink tunnel resource.

17. A mode switching method, performed by a terminal, wherein the method comprises:
- receiving a multicast air interface resource, wherein the multicast air interface resource is reserved based on multicast QoS information, the multicast air interface resource is used for the terminal to receive multicast service data in a switched-to target mode after a mode switching, and the multicast QoS information corresponds to the multicast service data,
- wherein the mode switching comprises that the terminal switches from a point-to-point PDU session mode of a source network-side device to the target mode of a target network-side device, and wherein the target mode is a point-to-multipoint multicast service transmission mode.

18. A terminal, comprising a processor, a memory, and a program or instructions stored in the memory and capable of running on the processor, wherein the program or instructions, when being executed by the processor, causes the processor to perform steps of the mode switching method according to claim 17.

19. A network-side device, comprising a processor, a memory, and a program or instructions stored in the memory and capable of running on the processor, wherein the program or instructions, when being executed by the processor, causes the processor to perform steps of the mode switching method according to claim 1.

20. A network-side device, comprising a processor, a memory, and a program or instructions stored in the memory and capable of running on the processor, wherein the program or instructions, when being executed by the processor, causes the processor to perform steps of the mode switching method according to claim 10.

* * * * *